United States Patent
Haas et al.

[11] Patent Number: 5,944,772
[45] Date of Patent: Aug. 31, 1999

[54] COMBINED ADDER AND LOGIC UNIT

[75] Inventors: Juergen Haas, Kusterdingen; Wilhelm Haller, Remshalden; Ulrich Krauch, Dettenhausen; Thomas Ludwig, Sindelfingen; Holger Wetter, Boeblingen, all of Germany

[73] Assignee: International Business Machines Corporation, Armonk, N.Y.

[21] Appl. No.: 08/970,076

[22] Filed: Nov. 13, 1997

[30] Foreign Application Priority Data

Nov. 7, 1997 [EP] European Pat. Off. .............. 97119502

[51] Int. Cl.[6] ....................................... G06F 7/50
[52] U.S. Cl. ............................................ 708/233; 708/714
[58] Field of Search ........................ 364/716.04, 716.01, 364/788; 708/233, 230, 314

[56] References Cited

U.S. PATENT DOCUMENTS

| | | | |
|---|---|---|---|
| 5,299,319 | 3/1994 | Vassiliadis et al. ................. | 364/716.04 |
| 5,487,025 | 1/1996 | Partori et al. ............................ | 364/788 |
| 5,764,550 | 6/1998 | D'Sovza ............................... | 364/716.04 |

*Primary Examiner*—David H. Malzahn
*Attorney, Agent, or Firm*—Marc A. Ehrlich

[57] ABSTRACT

A combined adder and logic unit having a reduced operation delay of arithmetic and logic operations, and providing an improved fan in and reduced wiring delays and capacity if implemented in the arithmetic and logic section of a microprocessor chip. The unit comprises a carry network (30) connected to operand inputs for generating carry-out signals of the byte positions (By0–By7) and further comprises a pre-sum logic (32) having a bit function generator (42) and a sum generator (45, 46, 48). Said bit function generator derives from the operands Ai and Bi bit functions Gi, Pi which are provided as logic function output and as input to said sum generator for producing preliminary arithmetic functions (SUM0, SUM1) to anticipate carry-in signals of one or zero. A result selector (70) is controlled by a byte position carry-out signal (Cy55) from the carry network means and by operation control signals to select from the output of said pre-sum logic one of the arithmetic functions (SUM0, SUM1) or one of the logic functions as result of the unit operation.

18 Claims, 4 Drawing Sheets

COMBINED ADDER AND LOGIC UNIT

FIELD OF THE INVENTION

The invention relates to a combined adder logic unit for performing fast arithmetic and logic operations with operands having a plurality of byte positions.

BACKGROUND OF THE INVENTION

Arithmetic and logic operations belong to the basic operations of information processors. The preferred operations are additions and subtractions and the logic functions AND, OR and XOR. Known processors contain an arithmetic and logic unit which comprises a binary adder unit and a separate logic unit for performing logic functions (FIG. 1). The design of arithmetic and logic units in integrated circuits is disclosed by Rabaey, "Digital Integrated Circuits, A Design Perspective", published by Prentice Hall, Englewood Cliffs, U.S.A., 1996, pages 383–408.

The known adder and logic units are also used to perform special functions such as processing character strings of variable length as required by database and text processing applications. DE 43 34 294 discloses a device of this type which includes an adder unit, a logic unit and an additional compare unit each of these units having its own operand input and output lines. With the increase of the circuit density wiring and wire delay becomes more and more a serious problem. The large number of input and output lines increase the RC delays and the capacity of the wiring and thus reduces the operation speed of the processor. In addition, the input lines represent a large fan-in characteristic which also reduces the timing of the circuits.

SUMMARY OF THE INVENTION

It is an object of the invention to reduce the operation delay of arithmetic and logic operations in a combined adder and logic unit and to improve the execution of string operations. Another object of the invention is to reduce the number of input and output lines of the adder and logic section of a processor. Still another object of the invention is to improve the fan in characteristic and to reduce the wiring delays and capacity of the arithmetic and logic part in a microprocessor chip. The invention is defined in the claims.

According to the invention the combined adder and logic unit comprises a carry network which is connected to operand inputs for generating carry-out signals of the byte positions, and further comprises a pre-sum logic having a bit function generator and a sum generator. Said bit function generator derives from the operands Ai and Bi bit functions Gi, Pi which are provided as logic function output of the unit and as input to said sum generator for producing preliminary arithmetic functions (SUM0, SUM1) to anticipate carry-in signals of one or zero. A result selector is controlled by a byte carry-out signal (Cy55) from said carry network and by operation control signals to select from the output of said pre-sum logic one of the arithmetic functions (SUM0, SUM1) or one of the logic functions as result of the operation of the unit.

BRIEF DESCRIPTION OF THE DRAWINGS

In the following a preferred embodiment of a combined adder and logic unit according to the invention is described with reference to accompanying drawings wherein the figures show:

FIG. 1 shows a known arithmetic and logic unit which consists of an adder unit and a separate logic unit. Each of these units contains two sets of input lines which are connected to operand registers storing the operands A and B. Each of these units also contains a set of output lines which are connected through an output multiplexer to result output lines. According to one of the aspects of the invention the large number of input and output lines is reduced by combining both units to a common unit which comprises a combined operand input and a combined result output.

DETAILED DESCRIPTION OF A PREFERRED EMBODIMENT OF THE INVENTION

Figure 1:
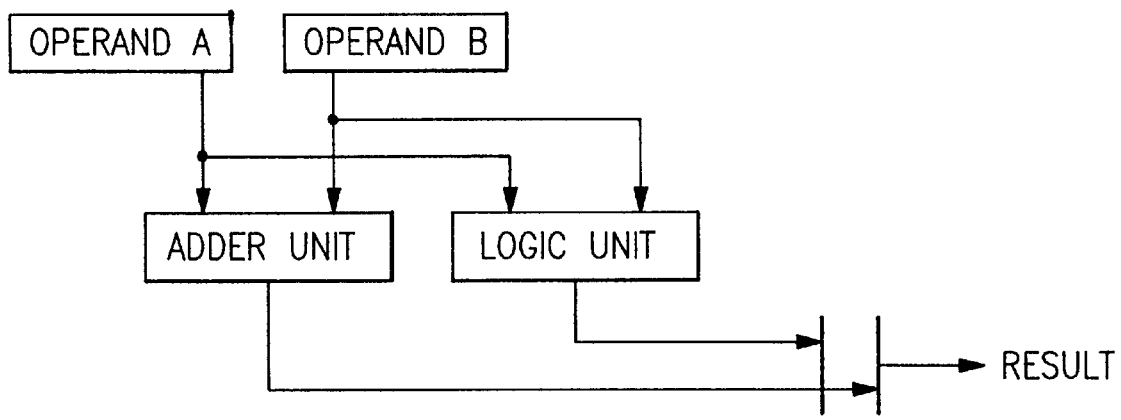
FIG. 1 an arithmetic and logic unit according to the prior art.
Figure 2:
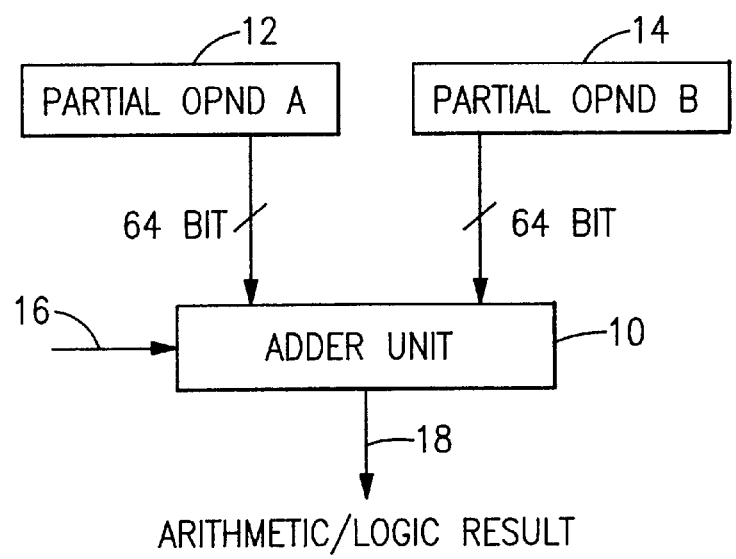
FIG. 2 the general structure of an adder/logic unit according to the invention.
Figure 3:
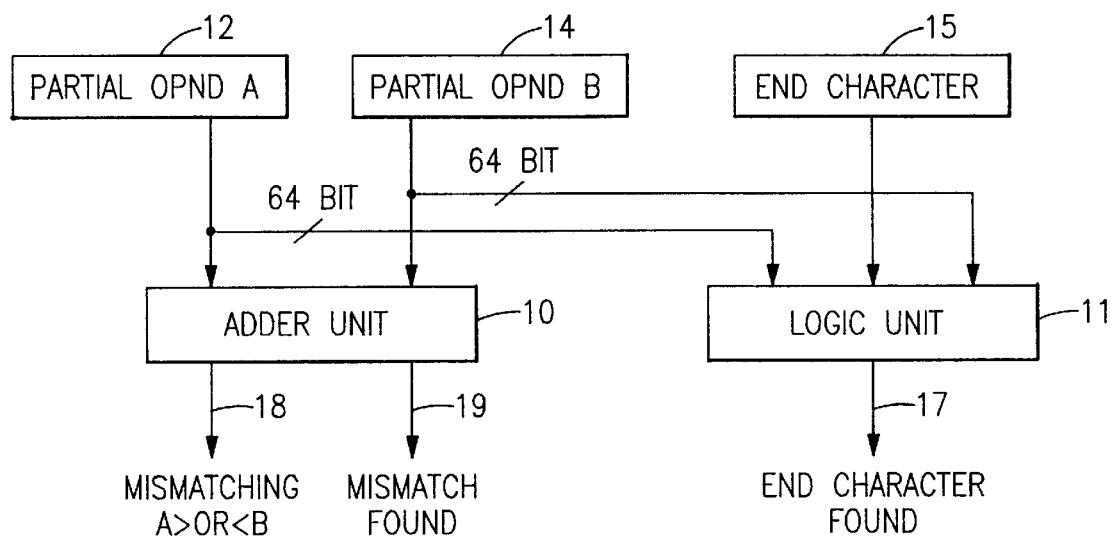
FIG. 3 the general structure of a modified adder/logic unit according to the invention for performing character strings operations.

An arithmetic unit which incorporates the capability to perform logic operations is shown in FIG. 2. This unit comprises an adder unit 10 with preferably 64 bit positions. Each bit position has two input lines which are connected to operand registers 12, 14 containing partial operands A, B of 64 bits or 8 bytes each. Control signals on an input 16 determine the arithmetic or logic functions of the adder. The outputs generated by the arithmetic and logic functions appear on combined result lines 18. The unit 10 may be used to process operands of variable length which represent binary operands or binary coded decimal operands, bit string operands or character strings terminated by an end character. For this latter type of operation FIG. 3 shows a modified implementation of the invention wherein a compare logic unit 11 is arranged in parallel to adder unit 10. The compare logic unit 11 receives the same operands A, B from registers 12 and 14 and performs a comparison of these operands with an end character stored in register 15. If the comparison results in a match situation an end character found signal is generated on output line 17. The adder unit 10 comprises an additional output line 19 which indicates a mismatch between operands A and B.

Figure 4:
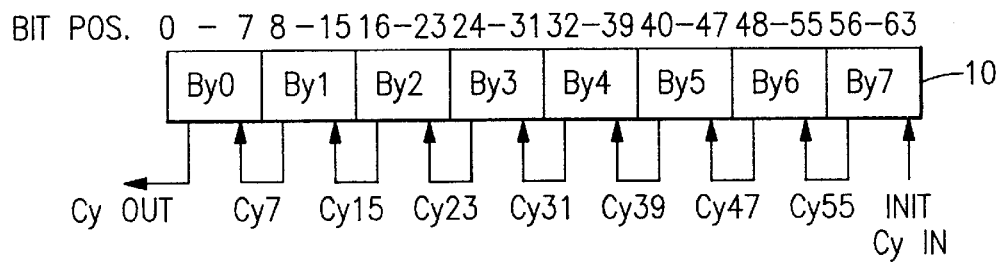
FIG. 4 a schematic block representation of the byte sections of the adder unit according to FIGS. 2 and 3.

As shown in FIG. 4, the 64 bit positions of the adder unit 10 are divided into byte sections By0–By7 where By7 is the least significant byte and By0 is the most significant byte. Byte carry-out signals Cy are produced in each byte section and transferred from the most significant bit position of each of the bytes to the least significant bit position of the next byte. In FIG. 4 the carry-out bit positions are designated by numbers. An initial carry-in signal INIT_Cy—IN is received by the least significant byte By7 and the most significant byte By0 generates a carry-out signal Cy_out.

Figure 5:
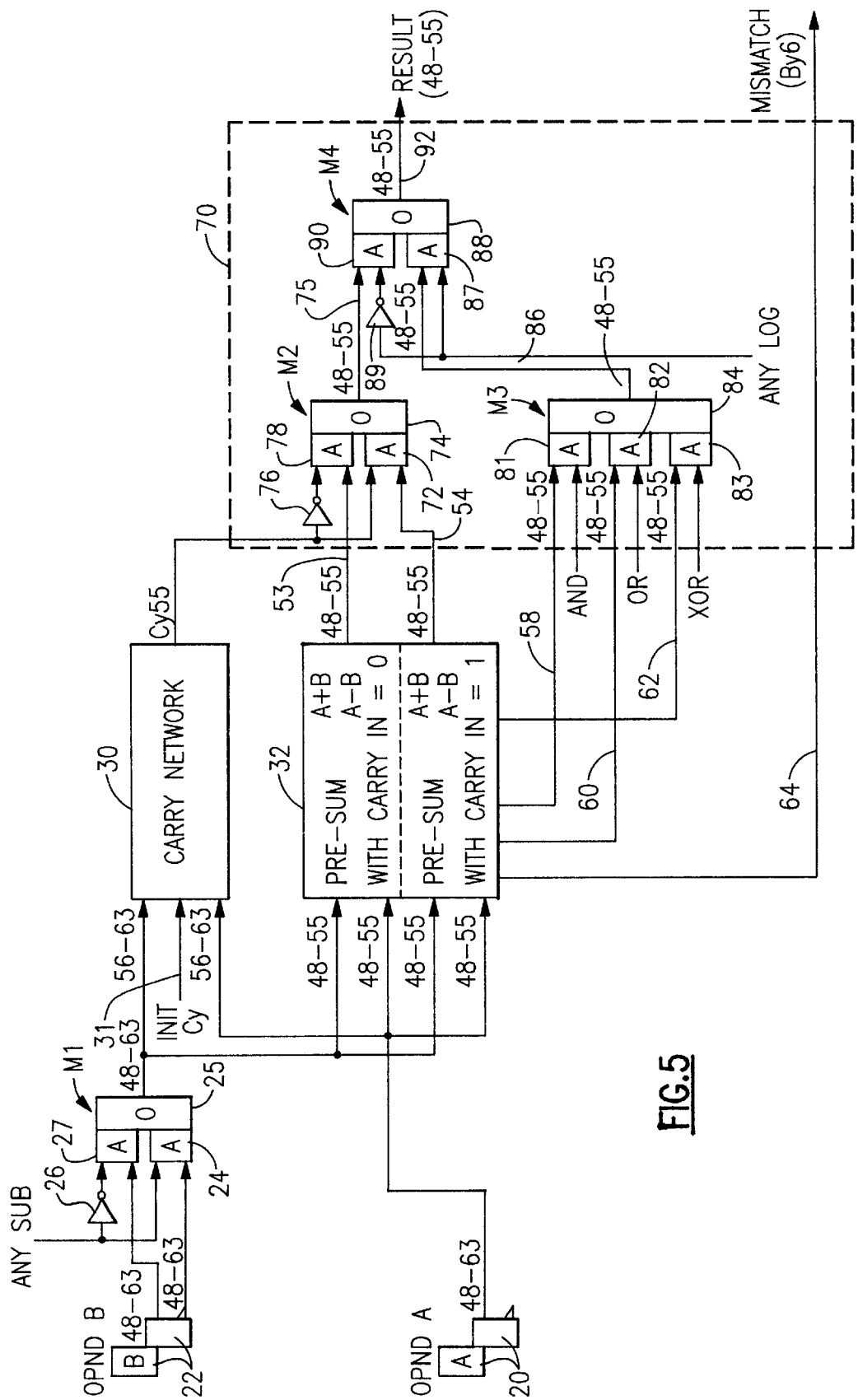
FIG. 5 the implementation of one byte section of the adder/logic unit of FIGS. 2 to 4.
Figure 6:
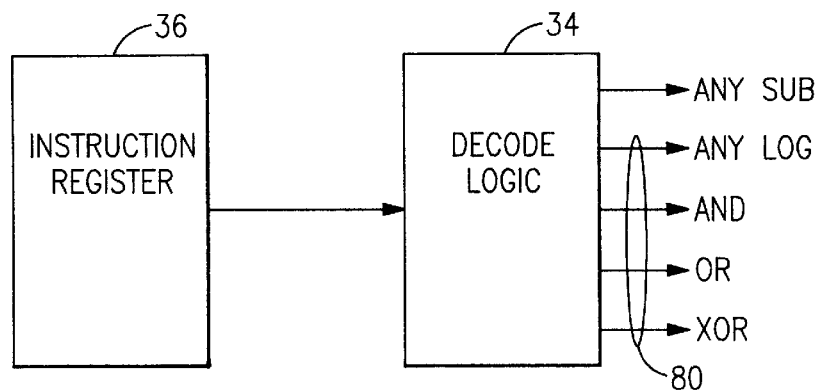
FIG. 6 an operation decoder as used in the adder/logic unit of FIG. 5.

The adder unit comprises in each byte position a carry network 30 and a pre-sum logic 32 as shown in FIG. 5 which represents byte section By6 of unit 10. Thus, each input of the carry network 30 and of the pre-sum logic 32 consists of 8 lines of which each line is assigned to one operand bit. The bits Ai of operand A are received from a first group of latches 20 which are part of operand register 12, and the bits Bi of operand B are received from a second group of latches 22 which are part of operand register 14. Each of the latches 20 and 22 contains the bits of two bytes By6 and By7 of the operands. In FIG. 5 the bit positions i of the operands and of the operation results are designated by corresponding numerals. The true outputs of the latches 20 are directly connected to the carry network 30 and the pre-sum logic 32 where the bits of byte By7 are transferred to the carry network 30 and the bits of byte By6 are transferred to the pre-sum logic 32. The true and complement outputs of latches 22 are connected to a multiplexer M1 which is gating the true or the complement output of the latches 22 to the carry network 30 and the pre-sum logic 32 where the derived bits of byte By7 are transferred to the carry network 30 and the derived bits of byte By6 are transferred to the pre-sum logic 32. The multiplexer M1 is controlled by an operation control signal ANY_SUB delivered by an operation decoder 34 according to an SUBTRACT instruction contained in an instruction register 36 (FIG. 6). The control signal ANY_SUB gates via AND-Circuit 24 and OR-circuit 25 the complement of Bi to the carry network 30 and the pre-sum logic 32. If the instruction register 36 contains another instructions such as ADD or a logic instruction, the control signal ANY_SUB is absent and through inverter 26, AND-circuit 27 and OR-circuit 25 the true bits of Bi are gated to the carry network 30 and the pre-sum logic 32. The carry network 30 receives also an initial carry signal INIT_Cy on line 31. In case of a subtract operation the signal INIT_Cy is one, in other cases, such as string operations, the signal INIT_Cy represents the carry-out of the 8 Byte group processed before.

The carry network 30 is the most timing critical circuit of the unit 10. It generates the 'hot' carries out of each byte by utilizing the carry look ahead principle. Accordingly, the carry-out of byte By7 is generated as follows:

$$Cy\_out = G0 + G1*P0 + G2*P0*P1 +$$
$$G3*P0*P1*P2 + G4*P1*P2*P3 + G5*P1*P2*P3*P4 +$$
$$G6*P1*P2*P3*P4*P5 + G7*P0*P1*P2*P3*P4*P5*P6 +$$
$$P0*P1*P2*P3*P4*P5*P7*InitCy\_in$$

wherein InitCy_in is the carry-in of the least significant bit position.

Figure 7:
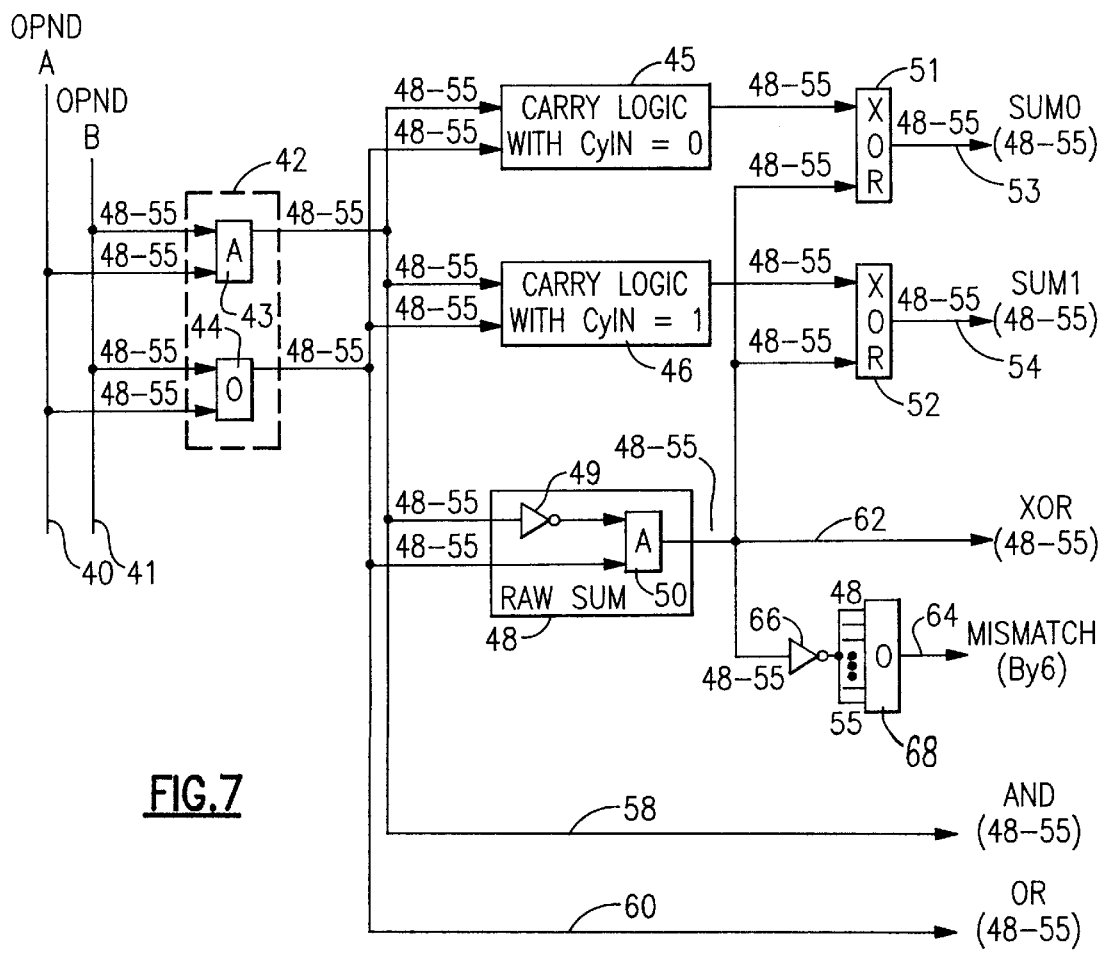
FIG. 7 a pre-sum logic as used in the adder/logic unit of FIG. 5.

The pre-sum logic 32 operates in parallel and independent of the carry network to simultaneously generate arithmetic sums and logic connections of the operands Ai and Bi. FIG. 7 shows an implementation of the pre-sum logic 32 of FIG. 2. Via 8 wire input lines 40, 41 the pre-sum-logic circuit 32 receives the operands Ai and Bi as described above, i.e. the bits Ai of operand A and the true or complemented bits Bi of operand B. From these input signals a bit function generator 42 produces the generate functions Gi=Ai*Bi by means of AND-circuits 43 and the propagate functions Pi=Ai+Bi by means of an OR-circuit 44. Both functions are supplied to carry logic circuits 45 and 46 and a raw sum logic 48. The carry logic circuit 45 performs the carry processing in the digit position shown on the assumption that the $Cy_{13}$ in signal is zero by implementing the following operations using the generate and propagate functions Gi and Pi as supplied by bit function generator 42:

Cy7=0
Cy6=G7
Cy5=G6+G7*P6
Cy4=G5+G6*P5+G7*P6*P5

Cy0=G1+G2*P1+G3*P1*P2+G4*P1*P2*P3+
G5*P1*P2*P3*P4+G6*P1*P2*P3*P4*P5+
G7*P1*P2*P3*P4*P3*P4*P5*P6 where i=0 . . . 7 for a singly byte or i=0 . . . 7, 8 . . . 15, 16 . . . 23, 24 . . . 31, etc. for an 8 byte operand.

Accordingly, the carry logic circuit 46 performs the carry processing on the assumption that the Cy_in signal is one by implementing the following operations:

Cy7=1
Cy6=P7
Cy5=G6+G7*P6
Cy4=G5+G6*P5+G7*P6*P5
Cy0=G1+G2*P1+G3*P1*P2+G4*P1*P2*P3+
G5*P1*P2*P3*P4+G6*P1*P2*P3*P4*P5+
P1*P2*P3*P4*P3*P4*P5*P6

The raw sum logic 48 implements the EXCLUSIVE OR function of the operands A and B by inverter circuits 49 and AND-circuits 50 for inverting the generate functions Gi and AND-connecting the Pi functions and the inverted Gi functions as follows:

$$RAW\_SUMi = Ai\,XOR\,Bi$$
$$= Ai*Bi' + Ai'*Bi$$
$$= (Ai*Bi)'*(Ai+Bi)$$
$$= Gi'*Pi$$

wherein i denotes the bits of the byte to be processed and denotes the complement of the designated term.

Two XOR-circuits 51, 52 combine the outputs of the carry logic circuits 45, 46 and the outputs of the raw sum logic 48 to generate on lines the sums SUM0 and SUM1 of the byte to be processed where SUM0 is based on the assumption that the Cy_in signal is zero and SUM1 is based on the assumption that the Cy_in signal is one.

The pre-sum logic 32 from FIG. 5 shares intrinsic logical functions of the operands Ai and Bi to generate logic functions as result outputs of the pre-sum logic 32 on output lines 58, 60, 62 and 64. Output lines 58 are connected to the outputs of AND-circuit 43 to generate the AND function of the operands Ai and Bi. Output lines 60 are connected to the outputs of OR-circuit 44 to generate the OR function of the operands Ai and Bi. Output lines 62 are connected to the outputs of the raw sum logic 48 to generate the EXCLUSIVE OR function of the operands Ai and Bi. The outputs of the raw sum logic 48 are also connected through inverter circuits 66 to an OR-circuit 68 which generates on output line 64 a signal MISMATCH By6. This signal indicates that the operand byte Ai and Bi of byte By6 are unequal.

The pre-sum logic 32 generates said logic functions simultaneously and in parallel to each other and also simultaneously and in parallel to the generation of the sums SUM0 and SUM1. It is thus possible to perform an addition A+B and one of the logic operations A 'and', A 'or', A 'xor' B in parallel. A result selector 70 is provided to determine the correct result of the unit 10 and to gate it to the combined result lines 18. The result selector 70 comprises multiplexer M2, M3 and M4 of which multiplexer M2 is connected to the sum output lines 53, 54 of the pre-sum logic 32. A byte carry-out signal Cy55 of 'one' from the byte position By7 of the carry network 30 controls the multiplexer M2 to gate the SUM1 signals through AND-circuit 72 and OR-circuit 74 via lines 75 to multiplexer M4. A byte carry-out signal Cy55 of 'zero' indicated by inverter 76 controls the multiplexer M2 to gate the SUM0 signals through AND-circuit 78 and OR-circuit 74 to multiplexer M4.

Multiplexer M3 is connected to the logic outputs 58, 60, 62 of the raw sum logic 48 and controlled by logic operation control lines 80 from OP-decoder 34 (FIG. 6) to gate a selected logic function to multiplexer M4. The multiplexer M3 comprises AND-circuits 81, 82, 83 which are controlled by the control signals AND, OR, XOR to select the corresponding logic function and which are followed by OR-circuit 84 the output of which is the logic result line 86. By applying a subtraction control signal ANY SUB to multiplexer M1 simultaneously with a logic control signal XOR to multiplexor M3 the raw sum logic 48 generates the inverted EXCLUSIVE OR function (XNOR) and multiplexer M3 gates the XNOR function to the logic result lines 86.

Multiplexer M4 distinguishes between arithmetic results on lines 75 and logic results on line 86. Multiplexer M4 is controlled by an operation control signal ANY_LOG which gates the logic result bits from lines 86 through AND-circuit 87 and OR-circuit 88 to the result lines 92 of the byte By6. If the operation control signal ANY_LOG is absent which is indicated by inverter 89, the sum bits are gated from lines 75 through AND-circuit 90 and OR-circuit 88 to the result lines 92 of byte By6.

As shown in FIG. 3, the adder unit according to the invention may be used to support operations on character strings of variable length such as described in DE 43 34 294. The end of a string may be marked by a special character or by a length indication. Common string operations are a logical comparison of two strings, a search for a special character within a string or moving strings. The operations are performed as long as the end character is not found or another condition such as 'the characters of the string are not equal zero' are fulfilled. String compare operations require arithmetical operations for condition code settings to indicate, for example, which of the mismatching character is the greater one.

In the modified implementation of FIG. 3 the adder unit 10 performs the logical compare of two characters of the operand strings A and B by using the logic function capability of unit 10 and the determination which of the mismatching characters is the greater one. A mismatch is indicated by a signal on line 19 which corresponds to output line 64 of the pre-sum logic 32 in FIG. 5. This signal is generated if at least one of the operand bit pairs of the byte shows a non-equal condition which is indicated by the EXCLUSIVE OR connection of that operand bits. Simultaneously, an operation control signal ANY_SUB from OP-decoder 34 urges a subtraction A−B of the same operands the result which appears on result lines 18 which corresponds to result lines 92 in FIG. 5. Within this result the byte carry-out signal of byte By0 indicates which operand is the greater one. If the carry-out signal is one, A is the greater operand and if the carry-out signal is zero, B is the greater operand. The result of the subtraction on lines 92 and the mismatch result signal on line 64 are generated in parallel so that they are available at the same time. In addition, compare logic unit 11 (FIG. 3) which operates in parallel to adder unit 11 indicates by a signal on its output line 17 if one of the operands A or B contains an end character of the string to be processed.

While the invention is described with reference to a preferred embodiment deviations, modifications or other embodiments of the invention are within the scope of the invention as defined by the annexed claims.

We claim:

1. A combined adder and logic unit (10) for generating arithmetic results of operands and for performing logic functions of said operands, each of said operands having a plurality of byte positions, said unit comprising:

(a) carry network means (30) connected to an operand input for generating carry-out signals of the byte positions (By);

(b) pre-sum logic means (32) comprising bit function generator means (42) and sum generator means (45, 46, 48, 51, 52), said bit function means deriving from the operands (A, B) bit functions (Gi, Pi) which are supplied as logic functions of the operands to the output of the pre-sum logic means and as input to said sum generator means for generating preliminary arithmetic functions (SUM0, SUM1) anticipating carry-in signals of zero or one, respectively; and (c) result selection means (70) operating in response to a byte position carry-out signal (Cy55) of said carry network means and to operation control signals (80) for selecting from the output of said pre-sum means one of the arithmetic functions (SUM0, SUM1) or one of the logic functions as a result of an operation of the unit.

2. A unit as recited in claim 1, wherein said sum generator means comprises first carry logic means (45) which generates from the bit functions (Gi, Pi) bit carry signals presuming a zero carry input into the byte position, and second carry logic means (46) which generates from the bit functions bit carry signals presuming a one carry input into the byte position.

3. A unit as recited in claim 2, wherein said sum generator means comprises raw sum means (48) generating from the bit functions a raw sum, and EXCLUSIVE OR circuit (51, 52) generating from the output of said first and second carry logic means (45, 46) and of said raw sum means preliminary sums (SUM0, SUM1).

4. A unit as recited in claim 3, wherein said supplied logic functions of said operands include the EXCLUSIVE OR function which is derived from the output of said raw sum means (48).

5. A unit as recited in claim 3, wherein said supplied logic functions of said operands include the inverted EXCLUSIVE OR function (XNOR) which is generated by a subtract operation control signal (SUB) and by inverting the output of said raw sum means (48).

6. A unit as recited in claim 5, wherein said supplied logic functions of said operands include the MISMATCH function.

7. A unit as recited in claim 3, comprising an OR-circuit means (68) which receives an inverted EXCLUSIVE NOR functions of all bits of the byte position from said raw sum means (48) to generate a logic byte function MISMATCH.

8. A unit as recited in claim 3, wherein said bit functions are the generate functions (Gi) and the propagate functions (Pi).

9. A unit as recited in claim 8, wherein said raw sum means (48) includes a circuit (49, 50) for performing a logical AND connection of the propagate functions (Pi) and the complemented generate functions (Gi).

10. A unit as recited in claim 1, wherein said pre-sum logic (32) is arranged in parallel to said carry network (30) and provides its outputs simultaneously with said carry network.

11. A unit as recited in claim 1, wherein said pre-sum logic means (32) comprises a logic function output (64) which is arranged in parallel to an arithmetic function output (SUM).

12. A unit as recited in claim 11, further including means for simultaneously utilizing both said logic function output (64) to indicate a mismatch of the operand bytes and said arithmetic function output (SUM) to indicated which of the operands is the greater one.

13. A unit as recited in claim 1, comprising true/complement means (M1) assigned to one of the operand inputs (Bi) and controlled by an operation control signal (ANY_SUB) to provide the complement of that operand to said carry network (30) and said pre-sum logic (32) for performing subtract operations.

14. A unit as recited in claim 1, wherein said logic functions include the AND function.

15. A unit as recited in claim 1, wherein said logic functions include the OR function.

16. A unit as recited in claim 1, wherein said result selection means (70) comprises a multiplexer (M2) which is controlled by the carry-out signals (Cy55) of said carry network (30) to gate one of the sums (SUM0 or SUM1) to the output of the unit.

17. A unit as recited in claim 1, wherein said result selection means (70) comprises a multiplexer (M3) which is controlled by logic operation control signals to gate one of said logic functions of the operands to the output of the unit.

18. A unit as recited in claim 1, wherein said result selection means (70) comprises a multiplexer (M4) which is controlled by an operation control signal (ANY_LOG) to distinguish between arithmetic operations and logic operations by gating either a preselected sum (SUM0 or SUM1) or a preselected logic function to the output of the unit.

* * * * *